(12) United States Patent
Black et al.

(10) Patent No.: US 6,763,500 B2
(45) Date of Patent: Jul. 13, 2004

(54) REAL-TIME-ON-DEMAND DYNAMIC DOCUMENT GENERATION

(75) Inventors: Jason E. Black, Redmond, WA (US); Sean D. Kelly, Redmond, WA (US); Tim A. Toyoshima, Seattle, WA (US)

(73) Assignee: Microsoft Corporation, Redmond, WA (US)

(*) Notice: Subject to any disclaimer, the term of this patent is extended or adjusted under 35 U.S.C. 154(b) by 667 days.

(21) Appl. No.: 09/681,046

(22) Filed: Dec. 1, 2000

(65) Prior Publication Data

US 2003/0033330 A1 Feb. 13, 2003

(51) Int. Cl.⁷ .................. G06F 17/00; G06F 15/00; G06F 17/21

(52) U.S. Cl. ........................ 715/513; 707/100

(58) Field of Search ................. 715/513, 515, 715/516, 526, 501; 707/1, 100; 704/9; 705/26

(56) References Cited

U.S. PATENT DOCUMENTS

| | | | | |
|---|---|---|---|---|
| 6,122,647 A | * | 9/2000 | Horowitz et al. | 715/513 |
| 6,182,095 B1 | * | 1/2001 | Leymaster et al. | 715/515 |
| 6,338,034 B1 | * | 1/2002 | Ishikawa et al. | 704/9 |
| 6,397,231 B1 | * | 5/2002 | Salisbury et al. | 715/515 |
| 6,473,778 B1 | * | 10/2002 | Gibbon | 715/501.1 |
| 6,591,280 B2 | * | 7/2003 | Orr | 715/513 |
| 6,636,845 B2 | * | 10/2003 | Chau et al. | 707/1 |
| 6,654,726 B1 | * | 11/2003 | Hanzek | 705/26 |
| 6,654,754 B1 | * | 11/2003 | Knauft et al. | 707/100 |
| 6,675,353 B1 | * | 1/2004 | Friedman | 715/513 |

* cited by examiner

Primary Examiner—Sanjiv Shah
(74) Attorney, Agent, or Firm—Lee & Hayes, PLLC

(57) ABSTRACT

Real-time, on-demand dynamic document generation is disclosed. A merging logic integrates one or more auxiliary files with a main file to dynamically generate a displayed document. The merging logic determines the number and the locations of the auxiliary files. The logic validates each auxiliary file against a schema that defines how the auxiliary files can modify the main file. After validation, the merging logic merges the auxiliary files with the main file in accordance with the schema to generate the document.

21 Claims, 4 Drawing Sheets

REAL-TIME-ON-DEMAND DYNAMIC DOCUMENT GENERATION

BACKGROUND OF INVENTION

This invention relates generally to dynamic document generation in real time and on demand, particularly from a main file and one or more auxiliary files.

Users frequently require reference to documents that change on a periodic basis. For example, computer programmers use online help facilities within integrated development environments to learn specifics of the operating system(s) for which they are developing. The specifics may include information regarding application programming interfaces (APIs), which are routines used by an application program to direct the performance of procedures by the operating system.

In some instances, the APIs may be used across a number of different platforms, such that the APIs are employed differently depending on the platform being used. Alternatively, different APIs may be specific to different platforms. Within the prior art, a programmer must refer to a number of different sources to learn how a particular API is used on particular platforms. For example, the programmer may reference a primary help file to learn about the API functionality generally. The programmer may also reference one or more supplemental help files to learn how the API is specifically used on a particular platform.

This can be a laborious and confusing process, however. The programmer may learn one thing from the main help file, and something contradictory from one of the supplemental files. Furthermore, development of the supplemental help files by vendors may require duplicative work, inasmuch as the supplemental help files integrate some of the information found in the main help file. For these and other reasons, there is a need for the present invention.

SUMMARY OF INVENTION

The invention relates to real-time, on-demand dynamic document generation. The document generated can be a help file, or another type of document. A merging logic integrates one or more auxiliary files with a main file to dynamically generate a displayed document. The merging logic first determines the number and the locations of the auxiliary files. The logic then validates each auxiliary file against a schema that defines the types of information that can be present in the auxiliary files. After validation, the merging logic merges the auxiliary files with the main file to generate the document.

The merging process performed by the merging logic performs no precompiling. The logic dynamically merges the auxiliary files with the main file, to generate the document in real time for display. The displayed document that is dynamically generated does not need to be stored a priori. That is, the user can view the document as it is being dynamically generated, on demand.

The main file is independent from the auxiliary files. If there are no auxiliary files, the main file can still be displayed as the document. The main file stands on its own, and does not require merging with any of the auxiliary files to be intelligible and useful to a user. The auxiliary files are detached from the main file. So long as the auxiliary files are consistent with the schema, they can be merged with the main file. The manner by which the main file can be extended by the auxiliary files is independent of the main file. Extending the main file in a new manner requires only that the schema and the merging logic be augmented, and appropriate auxiliary files modified or created.

The invention differs from word processing mail merging and other types of document merges within the prior art. With mail merging, the main file does not stand on its own. The main file is not intelligible without having been merged with external information. To change the manner by which the main file is merged with external information requires that the main file itself be changed. The merged file is typically stored a priori before the user can view the file.

Methods and systems of varying scope are encompassed by the invention. Other aspects, embodiments and advantages of the invention, beyond those described here, will become apparent by reading the detailed description and by referencing the drawings.

DETAILED DESCRIPTION

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, electrical, and other changes may be made without departing from the spirit or scope of the present invention. The following detailed description is, therefore, not to be taken in a limiting sense, and the scope of the present invention is defined only by the appended claims.

System for Dynamically Generating a Document

Figure 1:
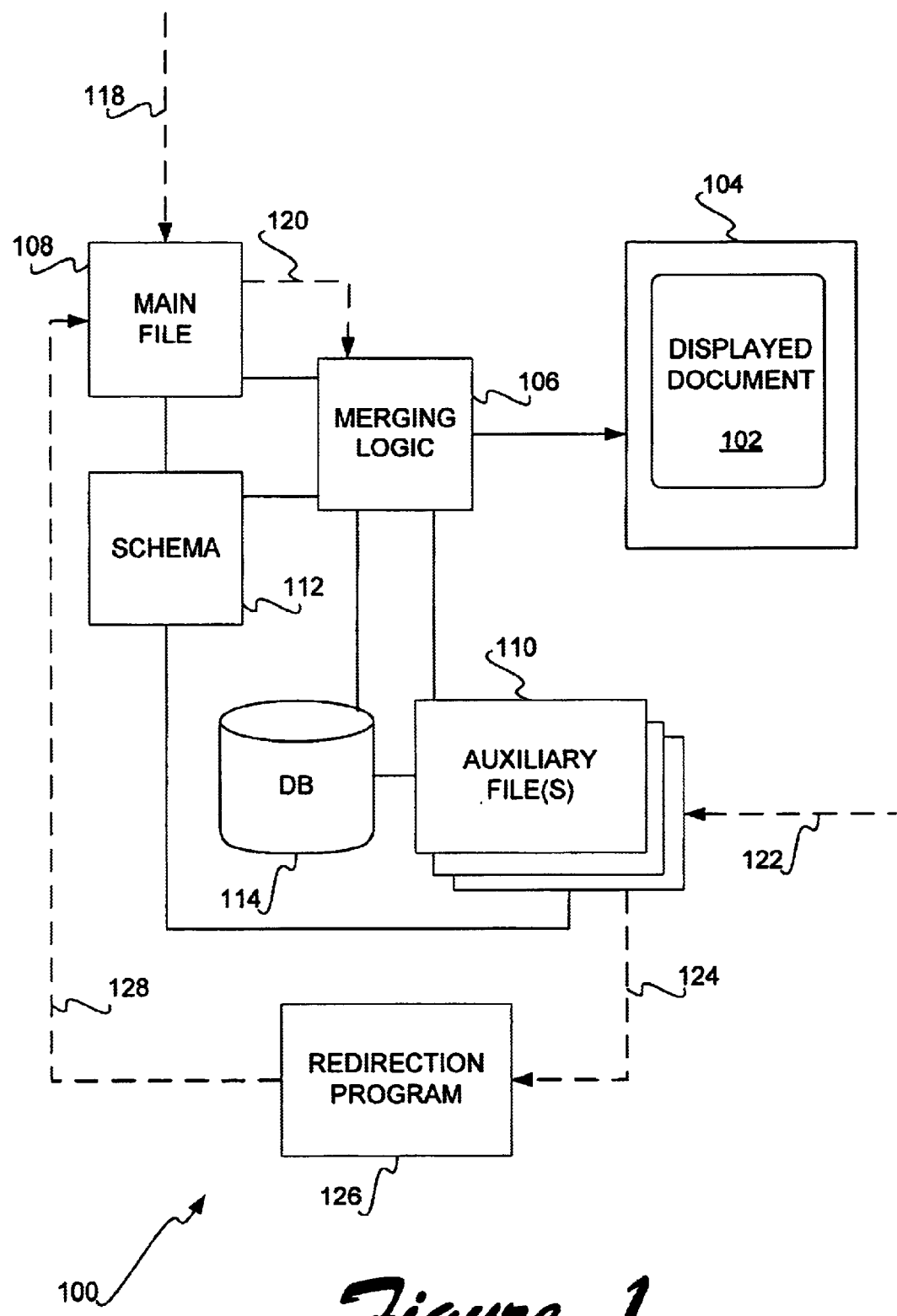
FIG. 1 is a diagram of a system according to an embodiment of the invention.

FIG. 1 shows a diagram of a system 100 according to an embodiment of the invention. The system 100 includes a merging logic 106. The merging logic 106 can be a computer program, such as a JavaScript script file, or a Visual Basic script file. The merging logic 106 merges information within the main file 108 with external information found in the auxiliary files 110 to dynamically generate a document 102 that can be displayed on a display 104. Generation is performed in real time, and on demand. Each of the main file 108 and the auxiliary files 110 can be consistent with a markup language, such as HyperText Markup Language (HTML) and extended Markup Language (XML), among others.

The auxiliary files 110 have their external information organized according to and validated against a schema 112, which can be an XML schema. The merging logic 106 is what validates the auxiliary files against the schema 112. The schema 112 is a separate file that defines the manners by which the auxiliary files 110 can modify the main file 108. Accordingly, the merging logic 106 merges the main file 108 with the auxiliary files 110 in accordance with the schema 112. The merging logic 106 learns the number and the location of the auxiliary files 110 by referencing a database 114. The database 114 can be the registry.

There are a number of different ways that the merging logic 106 can be executed to start the merging process that results in the displayed document 102. The main file 108 can also be referenced, as shown by the dotted line 118. The main file 108 preferably includes a reference to the merging logic 106, so that referencing the main file 108 causes the merging logic 106 to be executed, as shown by the dotted line 120. Alternatively, one of the auxiliary files 110 can be referenced, as shown by the dotted line 122. Each of the auxiliary files 110 preferably includes a reference to a redirection program 126, so that referencing one of the auxiliary files 110 causes the redirection program 126 to be executed, as shown by the dotted line 124. The redirection program 126 redirects to the main file 108, as shown by the dotted line 128. As before, reference to the main file 108 causes execution of the merging logic 106, as shown by the dotted line 120. The redirection program 126 can be an executable JavaScript script file. Alternatively, each of the auxiliary files 110 can include a JavaScript instruction that causes redirection to the main file 108.

Example Generated Document

Figure 2:
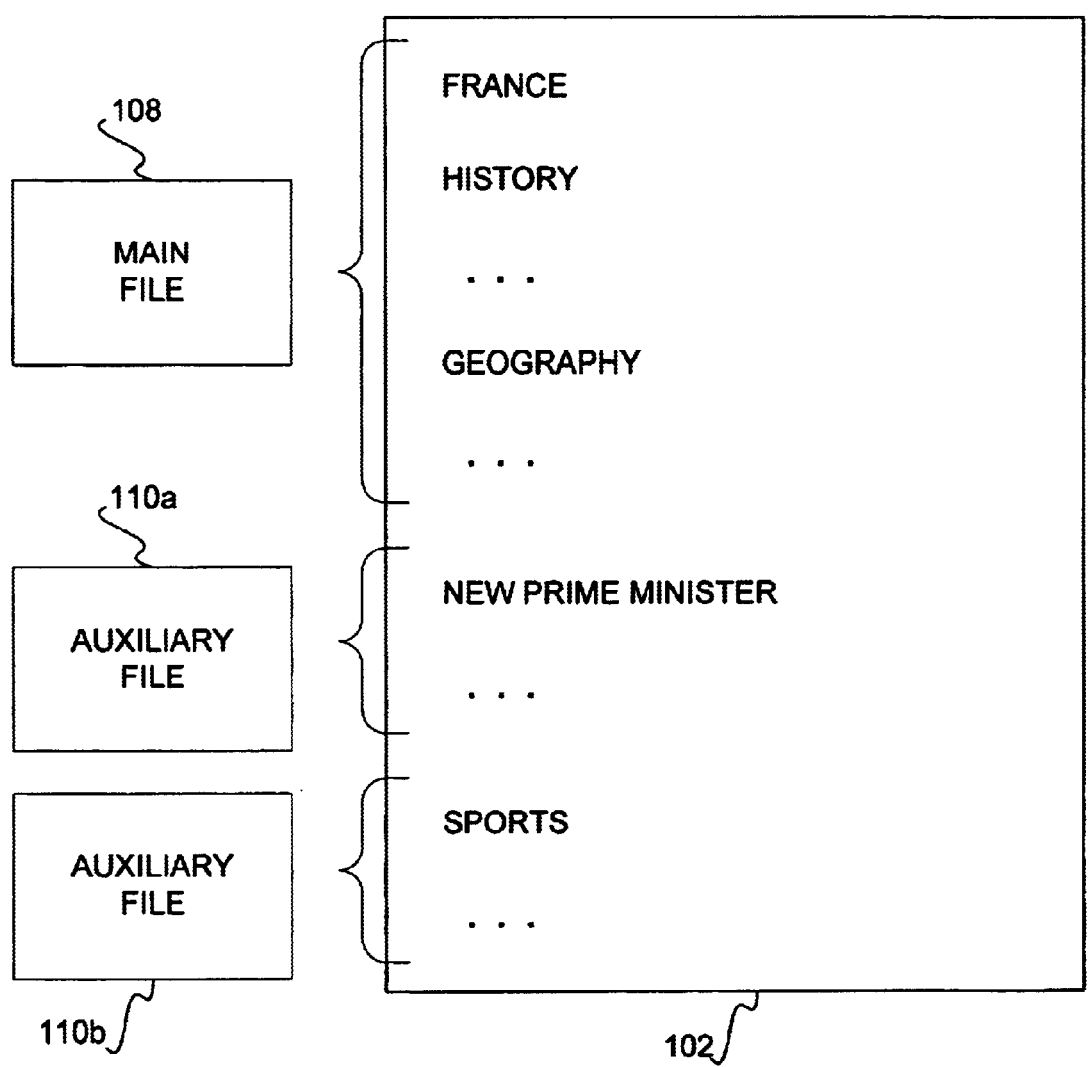
FIG. 2 is a diagram showing an example displayed document generated from a main file and two auxiliary files.

FIG. 2 shows a diagram 200 of a rudimentary example document that can be generated by the system 100 of FIG. 1 described in the previous section of the detailed description. The displayed document 102 is an example encyclopedia entry about France, having history, geography, new prime minister, and sports sections. The history and geography sections in the document 102 originated as information from the main file 108. The merging logic 106 of FIG. 1 merges external information from the auxiliary files 110*a* and 110*b* into the main file 108 to generate the document 102. The auxiliary file 110*a* is the source of the new prime minister section, while the auxiliary file 110*b* is the source of the sports section. The auxiliary files 110*a* and 110*b* are consistent with and validated against an appropriate schema 112, shown in FIG. 1.

The example generated document about France indicates how the invention can be used. Information that is basic, and changes infrequently, may be stored in the main file 108. The external information stored in the auxiliary files 110*a* and 110*b* may change more often. Rather than rewriting the main file 108, for example, the encyclopedia writer only has to modify the information stored in the auxiliary files 110*a* and 110*b*. The information of the main file 108 stands on its own, however. Where there are no auxiliary files 110*a* and 110*b*, the displayed document 102 still shows the history and geography sections of the main file 108.

Process Followed by Merging Logic to Dynamically Generate a Document

Figure 3:
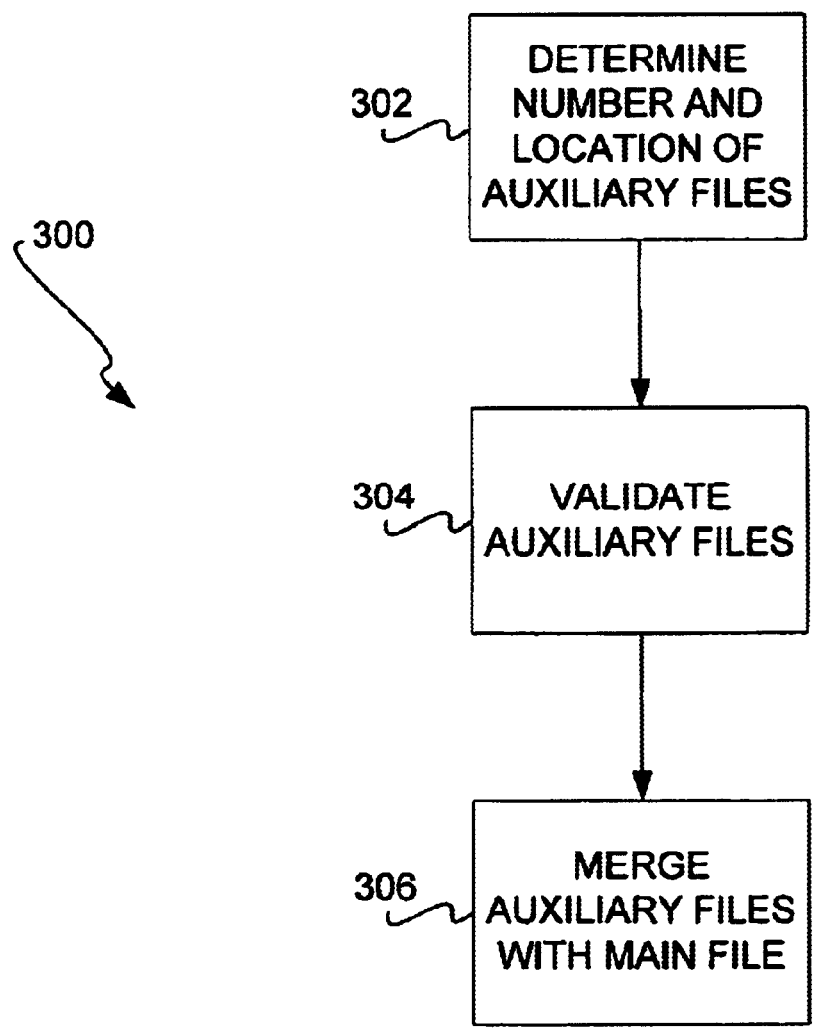
FIG. 3 is a flowchart of a method showing how one embodiment generates a document from a main file and one or more auxiliary files.

FIG. 3 is a flowchart of a method 300 that one embodiment performs to generate the displayed document 102. For example, the method 300 can be the process followed by the merging logic 106 to generate the document 102 by merging information from auxiliary files 110 with information in the main file 108. The description of the method 300 is made with reference to the system 100 of FIG. 1 for consistency.

In 302, the method 300 determines the number and location of the auxiliary files 110. For example, this information can be stored in the database 114 of FIG. 1. In 304, the method 300 uses an existing parser to validate the external information found in the auxiliary files 110 against the schema 112. Validation ensures that the information in the auxiliary files 110 is consistent with the schema 112, so that it can be merged with the information found in the main file 108. In 306, the method 300 merges the information from the auxiliary files 110 into the main file 108 to generate the displayed document 102.

Example Schema

An example schema is described to show how the invention can merge auxiliary files with a main file to dynamically generate a document. Significantly, only description of the schema is necessary to illustrate the merging process that the invention can perform. Auxiliary files are validated against the schema, and therefore the schema itself defines the way the auxiliary files can modify the main file. The main file stands apart from the auxiliary files, and therefore does not need separate description to substantiate how it can be merged with the auxiliary files.

The example schema is an XML schema, and begins with initialization information and some basic attribute definitions.

```
<?xml version="1.0" ?>
<Schema xmlns="urn:schemas-microsoft-com:xml-data" xmlns:dt=
"urn:schemas-microsoft-com:datatypes">

<AttributeType name="TechTag" dt:type="string"/>
<AttributeType name="TechName" dt:type="string"/>
<AttributeType name="SubTech" dt:type="string"/>
<AttributeType name="Version" dt:type="string"/>

<AttributeType name="FileName" dt:type="string"/>
<AttributeType name="FileDate" dt:type="dateTime"/>
<AttributeType name="Serve" dt:type="string"/>

<AttributeType name="Placement" dt:type="enumeration" dt:values=
"Start End Before After Alphabetical"/>
<AttributeType name="Component" dt:type="enumeration" dt:values=
"Entire Content Platform"/>

<AttributeType name="Target" dt:type="enumeration" dt:values=
"All CEOrly Win32Only CEReplacePage"/>

<AttributeType name="Key" dt:type="string"/>
<AttributeType name="Index" dt:type="number"/>
<AttributeType name="Column" dt:type="number"/>
<AttributeType name="ID" dt:type="string"/>
```

The Placement attribute is particularly relevant. The Placement attribute defines where external information in an auxiliary file should be located relative to a location in the main file. This attribute defines how the external information in the auxiliary file is merged with the information in the main file. The values for the attribute include at the start, at the end, after, and in alphabetical order.

The Target attribute defines a particular version or class of the main file in which the auxiliary file should appear. Based on the value of the Target attribute, the information can be applied to all main files, only to main files that are designated as CE (CEOnly), or only to main files that are designated as Win32 (Win32Only). This attribute can be used on specific section elements or can be used to specify that the entire main file should be replaced (CEReplace).

Basic text-handling elements of the schema are defined next.

```
<ElementType name="AddText" content="textOnly">
    <attribute type="Target"/>
    <attribute type="Placement"/>
</ElementType>
```

-continued

```
<ElementType name="Remove" content="textOnly">
    <attribute type="Target"/>
    <attribute type="Component"/>
</ElementType>

<ElementType name="Replace" content="eltOnly">
    <attribute type="Target"/>
    <attribute type="Component"/>
    <element type="AccText"/>
</ElementType>
```

The three basic elements are AddText, Remove (text), and Replace (text). These elements encapsulate the text that should be added, removed, or replaced. The AddText element is used by other element tags that represent sections, tables, lists, or other constructs, to specify the text to be added to those constructs. The Remove element allows the auxiliary file to remove, or delete, information. Finally, the Replace element allows the auxiliary file to replace, or change, information from the main file with external information.

Where the main file has one or more tables of information, rows and cells of the table can be modified by the auxiliary file as described by the following schema elements.

```
<ElementType name="ModifyCell" content="eltOnly">
    <attribute type="Key"/>
    <attribute type="Column"/>
    <element type="AddText" minOccurs="0" maxOccurs="*"/>
    <element type="Remove" minOccurs="0" maxOccurs="*"/>
    <element type="Replace" minOccurs="0" maxOccurs="*"/>
</ElementType>

<ElementType name="AddRow" content="eltOnly">
    <attribute type="Key"/>
    <attribute type="Placement"/>
    <element type="ModifyCell" minOccurs="0" maxOccurs="*"/>
</ElementType>

<ElementType name="DeleteRow" content="eltOnly">
    <attribute type="Target"/>
    <attribute type="Key"/>
</ElementType>

<ElementType name="Table" content="eltOnly">
    <attribute type="Index"/>
    <element type="AddRow" minOccurs="0" maxOccurs="*"/>
    <element type="DeleteRow" minOccurs="0" maxOccurs="*"/>
    <element type="ModifyCell" minOccurs="0" maxOccurs="*"/>
</ElementType>
```

The auxiliary file can modify a particular cell using the ModifyCell element of the schema. It can add a new row using the AddRow element, and delete an existing row in the main file using the DeleteRow element. The Table element defines the operations that can be performed on a table.

The schema also specifies how to add, modify, and remove information within a list of definitions that may be found in the main file, using the following schema elements.

```
<ElementType name="AddItem" content="eltOnly">
    <attribute type="Key"/>
    <attribute type="Placement"/>
    <element type="AddText" minOccurs="0" maxOccurs="*"/>
</ElementType>

<ElementType name="DeleteItem" content="eltOnly">
    <attribute type="Target"/>
    <attribute type="Key"/>
</ElementType>

<ElementType name="ModifyItem" content="eltOnly">
    <attribute type="Key"/>
    <element type="AddText" minOccurs="0" maxOccurs="*"/>
    <element type="Remove" minOccurs="0" maxOccurs="*"/>
    <element type="Table" minOccurs="0" maxOccurs="*"/>
</ElementType>

<ElementType name="List" content="eltOnly">
    <attribute type="Index"/>
    <element type="AddItem" minOccurs="0" maxOccurs="*"/>
    <element type="DeleteItem" minOccurs="0" maxOccurs="*"/>
    <element type="ModifyItem" minOccurs="0" maxOccurs="*"/>
</ElementType>

<ElementType name="Term" content="eltOnly">
    <element type="AddText" minOccurs="0" maxOccurs="*"/>
    <element type="Remove" minOccurs="0" maxOccurs="*"/>
    <element type="Replace" minOccurs="0" maxOccurs="*"/>
</ElementType>

<ElementType name="Definition" content="eltOnly">
    <element type="AddText" minOccurs="0" maxOccurs="*"/>
    <element type="Remove" minOccurs="0" maxOccurs="*"/>
    <element type="Replace" minOccurs="0" maxOccurs="*"/>
    <element type="Table" minOccurs="0" maxOccurs="*"/>
</ElementType>

<ElementType name="AddDefItem" content="eltOnly">
    <attribute type="Key"/>
    <attribute type="Placement"/>
    <element type="Term" minOccurs="0" maxOccurs="*"/>
    <element type="Definition" minOccurs="0" maxOccurs="*"/>
</ElementType>

<ElementType name="DeleteDefItem" content="eltOnly">
    <attribute type="Target"/>
    <attribute type="Key"/>
</ElementType>

<ElementType name="ModifyDefItem" content="eltOnly">
    <attribute type="Key"/>
    <element type="Term" minOccurs="0" maxOccurs="*"/>
    <element type="Definition" minOccurs="0" maxOccurs="*"/>
</ElementType>

<ElementType name="DefList" content="eltOnly">
    <attribute type="Index"/>
    <element type="AddDefItem" minOccurs="0" maxOccurs="*"/>
    <element type="DeleteDefItem" minOccurs="0" maxOccurs="*"/>
    <element type="ModifyDefItem" minOccurs="0" maxOccurs="*"/>
</ElementType>
```

The List element defines the operations that can be performed on a list, as specified by the AddItem element to add an item to the list, the DeleteItem element to remove an item from the list, and the ModifyItem element to change an item in the list. Two particular types of items are specified in the schema, a Term element to define a term, and a Definition element to define the definition for a term. Definition items can be added, deleted, or modified, using the AddDefItem, DeleteDefItem, and ModifyDefItem elements, respectively. The DefList element specifies the operations that can be performed on definitions in the list, as the AddDefItem, DeleteDefItem, and ModifyDefItem elements.

The schema specifies how auxiliary files can modify code, such as program listings, within the main file, using the following Code element.

```
<ElementType name="Code" content="eltOnly">
    <attribute type="Index"/>
    <element type="AddText" minOccurs="0" maxOccurs="*"/>
    <element type="Remove" minOccurs="0" maxOccurs="*"/>
    <element type="Replace" minOccurs="0" maxOccurs="*"/>
</ElementType>
```

The Code element specifies that text can be added, deleted, or changed, by using the AddText, Remove, and Replace elements, respectively.

The schema next defines what a section is within the main file that can be modified by an auxiliary file.

```
<ElementType name="Section" content="eltOnly">
    <attribute type="ID"/>
    <element type="AddText" minOccurs="0" maxOccurs="*"/>
    <element type="Remove" minOccurs="0" maxOccurs="*"/>
    <element type="Replace" minOccurs="0" maxOccurs="*"/>
    <element type="Code" minOccurs="0" maxOccurs="*"/>
    <element type="Table" minOccurs="0" maxOccurs="*"/>
    <element type="DefList" minOccurs="0" maxOccurs="*"/>
    <element type="List" minOccurs="0" maxOccurs="*"/>
</ElementType>
```

In particular, the Section element specifies that information can be code, a table, definitions within a list, or a list, as specified by the Code, Table, DefList, and List elements, respectively. Where the information is none of these, such as generic text, then the Section element specifies that it can be augmented, deleted, or changed by using the AddText, Removed, and Replace elements, respectively.

The example schema concludes with some housekeeping information, as follows.

```
<ElementType name="MergeInfo" content="empty">
    <attribute type="Target"/>
    <attribute type="FileName"/>
    <attribute type="FileDate"/>
    <attribute type="Server"/>
</ElementType>

<ElementType name="SourceFile" content="eltOnly">
    <attribute type="FileName"/>
    <attribute type="FileDate"/>
    <attribute type="Server"/>
    <element type="MergeInfo" minOccurs="0" maxOccurs="*"/>
    <element type="Section" minOccurs="0" maxOccurs="*"/>
</ElementType>

<ElementType name="OwnerTech" content="empty">
    <attribute type="TechTag"/>
    <attribute type="TechName"/>
    <attribute type="SubTech"/>
    <attribute type="Version"/>
</ElementType>

<ElementType name="DeltaFile" content="eltOnly">
    <element type="OwnerTech" minOccurs="0" maxOccurs="*"/>
    <element type="SourceFile" minOccurs="0" maxOccurs="*"/>
</ElementType>

</Schema>
```

Example Computerized Device

Figure 4:
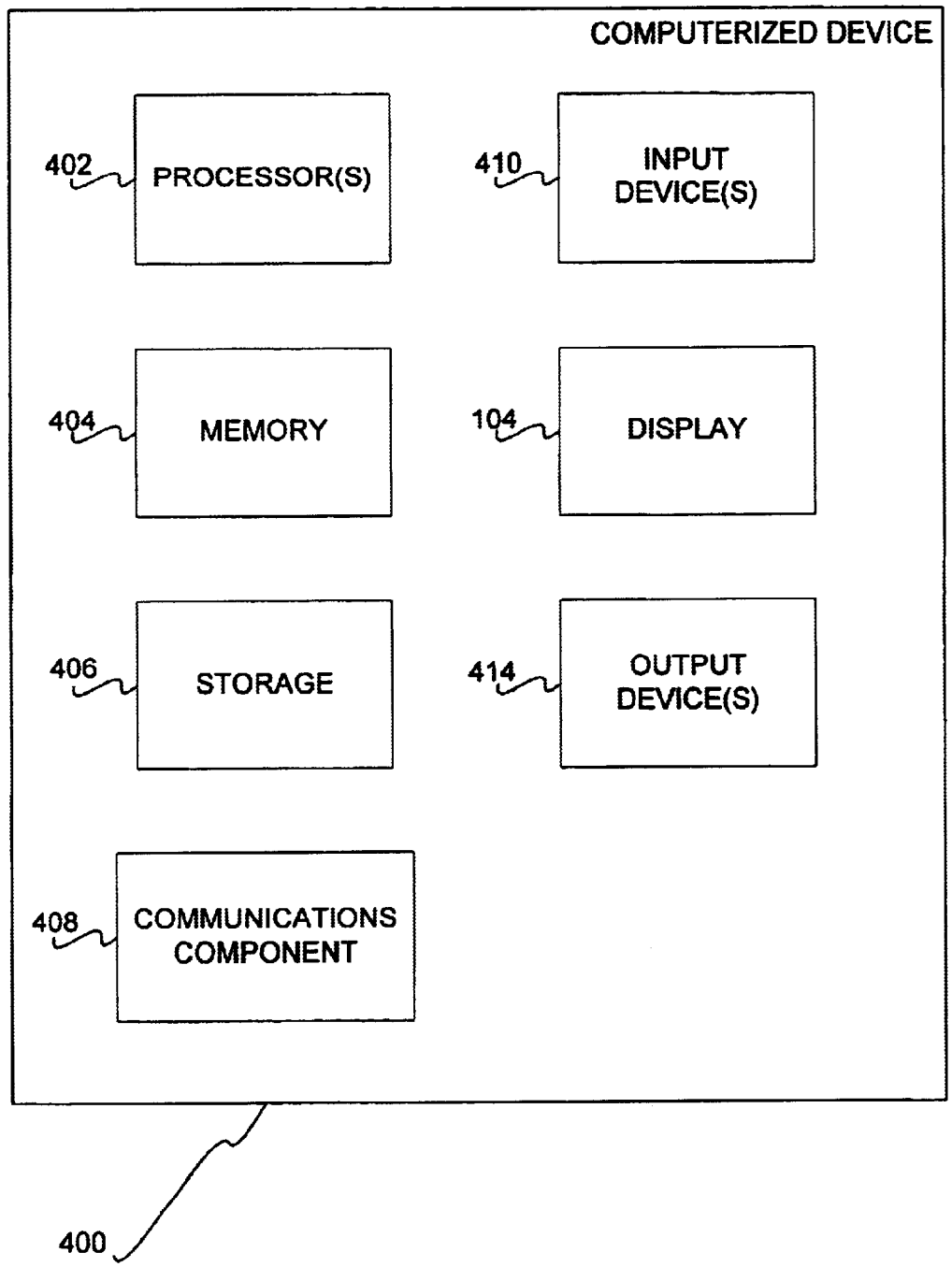
FIG. 4 is a diagram of an example computerized device that can be used to implement the invention.

The invention can be implemented within a computerized environment having one or more computerized devices. The diagram of FIG. 4 shows an example computerized device 400. The example computerized device 400 can be, for example, a desktop computer, a laptop computer, or a personal digital assistant (PDA). The invention may be practiced with other computer system configurations as well, including multiprocessor systems, microprocessor-based or programmable consumer electronics, network computers, minicomputers, and mainframe computers. The invention may be practiced in distributed computing environments where tasks are performed by remote processing devices that are linked through a communications network.

The device 400 includes one or more of the following components: processor (s) 402, memory 404, storage 406, a communications component 408, input device(s) 410, a display 104, and output device(s) 414. For a particular instantiation of the device 400, one or more of these components may not be present. For example, a PDA may not have any output device(s) 414. The description of the device 400 is to be used as an overview of the types of components that typically reside within such a device, and is not meant as a limiting or exhaustive description.

The processor(s) 402 may include a single central-processing unit (CPU), or a plurality of processing units, commonly referred to as a parallel processing environment. The memory 404 may include read-only memory (ROM) and/or random-access memory (RAM). The storage 406 may be any type of storage, such as fixed-media storage devices and removable-media storage devices. Examples of the former include hard disk drives, and flash or other non-volatile memory. Examples of the latter include tape drives, optical drives like CD-ROM drives, and floppy disk drives. The storage devices and their associated computer-readable media provide non-volatile storage of computer-readable instructions, data structures, program modules, and other data. Any type of computer-readable media that can store data and that is accessible by a computer can be used.

The device 400 may operate in a network environment. Examples of networks include the Internet, intranets, extranets, local-area networks (LAN"s), and wide-area networks (WAN"s). The device 400 may include a communications component 408, which can be present in or attached to the device 400. The component 408 may be one or more of a network card, an Ethernet card, an analog modem, a cable modem, a digital subscriber loop (DSL) modem, and an Integrated Services Digital Network (ISDN) adapter. The input device(s) 410 are the mechanisms by which a user provides input to the device 400. Such device(s) 410 can include keyboards, pointing devices, microphones, joysticks, game pads, and scanners. The display 104 is how the device 400 typically shows output to the user. The display 104 can include cathode-ray tube (CRT) display devices and flat-panel display (FPD) display devices. The device 400 may provide output to the user via other output device(s) 414. The output device(s) 414 can include speakers, printers, and other types of devices.

The methods that have been described can be computer-implemented on the device 400. A computer-implemented method is desirably realized at least in part as one or more programs running on a computer. The programs can be executed from a computer-readable medium such as a memory by a processor of a computer. The programs are desirably storable on a machine-readable medium, such as a floppy disk or a CD-ROM, for distribution and installation and execution on another computer. The program or programs can be a part of a computer system, a computer, or a computerized device.

Conclusion

It is noted that, although specific embodiments have been illustrated and described herein, it will be appreciated by those of ordinary skill in the art that any arrangement that is calculated to achieve the same purpose may be substituted for the specific embodiments shown. This application is intended to cover any adaptations or variations of the present invention. Therefore, it is manifestly intended that this invention be limited only by the claims and equivalents thereof.

What is claimed is:

1. A method for dynamically generating a displayed document from a main file and at least one auxiliary file in real time and on demand, comprising:

validating each auxiliary file against a predetermined schema, the schema specifying how the at least one auxiliary file can modify the main file; and, merging external information from each auxiliary file with information in the main file, in accordance with the predetermined schema, to generate the document.

2. The method of claim 1, wherein the main file is consistent with a predetermined markup language.

3. The method of claim 2, wherein the predetermined markup language is one of HyperText Markup Language (HTML) and extended Markup Language (XML).

4. The method of claim 1, wherein each of the at least one auxiliary file and the predetermined schema is consistent with a predetermined markup language.

5. The method of claim 4, wherein the predetermined markup language is eXtended Markup Language (XML).

6. The method of claim 1, wherein the main file stands on its own, such that the document can include the information within the main file where no auxiliary files are present.

7. The method of claim 1, further initially comprising referencing a database to determine a number of the at least one auxiliary file, and a location of each of the at least one auxiliary file.

8. The method of claim 7, wherein the database is a registry database.

9. The method of claim 1, wherein the external information retrieved from each of one or more of the at least one auxiliary file deletes existing information in the main file.

10. The method of claim 1, wherein the external information retrieved from each of one or more of the at least one auxiliary file changes existing displayable information in the main file.

11. The method of claim 1, wherein the external information retrieved from each of one or more of the at least one auxiliary file augments existing displayable information in the main file.

12. The method of claim 1, wherein the method is performed by execution of a computer program stored on a machine-readable medium by a processor.

13. The method of claim 12, wherein the computer program is written in one of JavaScript and Visual Basic script.

14. The method of claim 1, wherein the method embodies a merging logic for generating the displayed document from the main file and the at least one auxiliary file.

15. A system for dynamically generating a displayed document in real time and on demand comprising:

a main file of information;

a predetermined schema specifying how the main file of information can be modified;

at least one auxiliary file, each auxiliary file having external information consistent with the predetermined schema; and, a merging logic referenced by the main file to generate the displayed document in real time and on demand from the main file and the at least one auxiliary file in accordance with the predetermined schema, such that calling the main file causes execution of the merging logic.

16. The system of claim 15, wherein the merging logic merges the external information from the at least one auxiliary file with the information in the main file.

17. The system of claim 15, wherein the merging logic validates each auxiliary file against the predetermined schema.

18. The system of claim 15, further comprising a database storing a number and a location of each of the at least one auxiliary file.

19. The system of claim 18, wherein the merging logic references the database to determine the number and the location of each auxiliary file.

20. The system of claim 15, wherein the main file stands on its own, such that the document can include the information within the main file where no auxiliary files are present.

21. The system of claim 15, further comprising a redirection program referenced by each auxiliary file, such that calling an auxiliary file causes execution of the redirection program, the redirection program redirecting execution to the main file.

* * * * *